United States Patent [19]

Gaku et al.

[11] Patent Number: 4,820,855

[45] Date of Patent: Apr. 11, 1989

[54] PROCESS FOR PRODUCING POLYFUNCTIONAL CYANATE ESTER POLYMER

[75] Inventors: Morio Gaku; Hidenori Kimbara, both of Saitama, Japan

[73] Assignee: Mitsubishi Gas Chemical Company, Inc., Tokyo, Japan

[21] Appl. No.: 109,199

[22] Filed: Oct. 16, 1987

[30] Foreign Application Priority Data

Oct. 17, 1986 [JP] Japan .................................. 61-245456
Dec. 25, 1986 [JP] Japan .................................. 61-307778

[51] Int. Cl.$^4$ ........................ C07F 9/09; C07C 122/00
[52] U.S. Cl. ...................................... 558/167; 558/192; 560/301
[58] Field of Search .................. 560/301; 558/167, 192

[56] References Cited

U.S. PATENT DOCUMENTS 3,383,359  5/1968  Weitzel et al. ........................ 560/301
3,694,410  9/1972  Ochmke .............................. 560/301
4,110,364  8/1978  Gaku et al. ......................... 560/301

Primary Examiner—Mary C. Lee
Assistant Examiner—Robert C. Whittenbaugh
Attorney, Agent, or Firm—Browdy and Neimark

[57] ABSTRACT

A process for producing a polyfunctional cyanate ester polymer which comprises heating at least one polyfunctional cyanate ester compound having the formula:

$$R(OCN)_m$$

wherein m is an integer of at least 2 and R is one or more aromatic organic groups, and the cyanato groups are bonded to the arylene ring, in the presence of a catalytic amount of a dialkyl tin oxide having the formula:

$$R^1R^2SnO$$

wherein each of $R^1$ and $R^2$ is $C_1$-$C_{30}$ alkyl is disclosed.

4 Claims, No Drawings

PROCESS FOR PRODUCING POLYFUNCTIONAL CYANATE ESTER POLYMER

FIELD OF THE INVENTION

The present invention relates to a process for producing a polyfunctional cyanate ester polymer by heating a polyfunctional cyanate ester compound, and a process for producing a molding, a coating, a casting, a laminate or a sheet comprising a polyfunctional cyanate ester polymer which comprises curing a polyfunctional cyanate ester resin.

BACKGROUND OF THE INVENTION

A polyfunctional cyanate ester compound is polymerized or cured by heating. West German Pat. No. 1,190,184 discloses a process for polymerizing a polyfunctional cyanate ester compound in the presence of a Lewis acid, phosphoric acid, hydrochloric acid, sodium hydroxide, tributyl phosphine, trimethyl amine, phospholin-$\Delta^3$-1 oxo-1-phenyl or the like. In addition, U.S. Pat. No. 3,694,410, discloses carrying out of the polymerization in the presence of a metal chelate, such as an acetyl acetone metal salt.

It takes a long time to carry out the polymerization in the absence of any catalyst. The cured products obtained by the process of West German Pat. No. 1,190,184 have poor electrical properties. In addition, in U.S. Pat. No. 3,694,410, solubility of the metal chelate to the resin composition is poor, so a special solvent is necessary in order to enhance the solubility.

SUMMARY OF THE INVENTION

The present inventors have carried out research on catalysts which have good solubility to the resin composition, which remarkably accelerate the polymerization even when a small amount of catalyst is used, and which can control the polymerization. As a result we have found that dialkyl tin oxides function well as such catalyst. This invention is based on this discovery.

This invention relates to a process for producing a polyfunctional cyanate ester polymer which comprises heating at least one polyfunctional cyanate ester compound having the formula:

R(OCN)$_m$ wherein m is an integer of at least 2 and R is one or more aromatic organic groups, and the cyanato groups are bonded to the arylene ring, in the presence of a catalytic amount of a dialkyl tin oxide having the formula:

R$^1$R$^2$SnO wherein each of R$^1$ and R$^2$ is C$_1$–C$_{30}$ alkyl.

DETAILED EXPLANATION OF THE INVENTION

Polyfunctional cyanate ester compounds having at least one cyanato group in their molecules which may be employed as the component (a) are represented by the formula:

R(OCN)$_m$    (1)

wherein m is an integer of at least 2, and usually not more than 5; R is one or more aromatic organic groups, and preferably R is arylene, C$_1$–C$_4$ alkyl or halogen-substituted arylene, or a plurality of arylene or C$_1$–C$_4$ alkyl or halogen-substituted arylene which are linked by

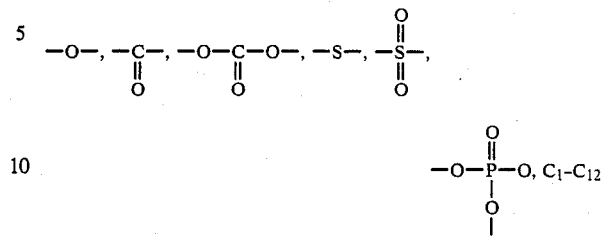

alkylene or C$_5$–C$_{12}$ cycloalkylene, and the cyanato groups are bonded to the arylene ring.

Examples of these cyanate ester compounds include alkyl cyanato benzenes, such as monocyanato benzene and p-tert.-butyl cyanato benzene, monocyanato naphthalene, 1,3- or 1,4-dicyanato benzene, 1,3,5-tricyanato benzene, 1,3-, 1,4-, 1,6-, 1,8-, 2,6- or 2,7-dicyanato naphthalene, 1,3,6-tricyanato naphthalene, 4,4'-dicyanato biphenyl, bis(4-cyanatophenyl)methane, 1,1-bis(4-cyanatophenyl)cyclohexane, 2,2-bis(4-cyanatophenyl)propane, 2,2-bis(3,5-dichloro-4-cyanatophenyl)propane, 2,2-bis(3,5-dibrome-4-cyanatophenyl)propane, bis(4-cyanatophenyl)ether, bis(4-cyanatophenyl)thioether, bis(4-cyanatophenyl)sulfone, tris(4-cyanatophenyl)phosphate, cyanate esters obtained by reacting a hydroxy-terminated polycarbonate oligomer with a cyanogen halide (U.S. Pat. No. 4,026,913), cyanate esters obtained by reacting novolak with a cyanogen halide (U.S. Pat. Nos. 4,022,755 and 3,448,079) and styryl pridine or styryl pyrazine cyanates (U.S Pat. No. 4,578,439). Other cyanate ester compounds are given in Japanese Patent Publication (Kokoku) Nos. 1928/1966; 18468/1968; 4791/1969; 11712/1970, 41112/1971 and 26853/1972 and Japanese Patent Laid-Open Publication (Kokai) No. 63149/1976 and U.S. Pat. Nos. 3,553,244; 3,755,402; 3,740,348; 3,595,900; 3,694,410 and 4,116,946 which are incorporated herein by reference.

Prepolymers having sym-triazine ring obtained by trimerizing the OCN group in the cyanate ester and unreacted cyanato group can be used as a cyanate ester compound.

The above polyfunctional cyanate ester can be used as it is, or a prepolymer having a cyanato group or cyanato groups in its molecule obtained by polymerizing the above polyfunctional cyanate ester in the presence or absence of a mineral acid, Lewis acid, a salt such as sodium carbonate or lithium chloride, a phosphate each as tributyl phosphine, or an organic metal salt at an elevated temperature can be used, or a preliminary reaction of the above polyfunctional cyanate ester with a monofunctional or polyfunctional maleimide as explained in the following can also be used.

As occasion demands, other thermosetting monomers or prepolymers or resin components can be incorporated into the cyanate ester compound. In addition, the cyanate ester compounds may contain fiber reinforcing materials, fillers, dyes, pigments, thickeners, lubricants, coupling agents, self-extinguishing agents and the like.

Examples of the thermosetting monomers or prepolymers which can be incorporated into the cyanate ester compound include polyacrylate or polymethacrylates, such as polyfunctional acrylates, methacrylates, alkyl acrylates, alkyl methacrylates, epoxy acrylates and epoxy methacrylates; polyallyl compounds, such as diallyl phthalate divinyl benzene, diallyl benzene, trialkenyl isocyanurate and prepolymers thereof; dicyclopentadiene and prepolymer thereof; phenol resins; xylene resins; polyfunctional epoxy compounds; and polyfunctional maleimide compounds.

Examples of the resin components include polyvinyl acetal resins, such as polyvinyl formal, polyvinyl acetal and polyvinyl butyral; Phenoxy resins; acrylic resins having OH groups or COOH groups; silicone resins; alkyd resins; thermoplastic polyurethane resins; non-crosslinked or non-vulcanized rubbers, such as polybutadiene, butadiene-acrylonitrile copolymer, polychloroprene, butadiene-styrene copolymer, polyisoprene, butyl rubber or natural rubbers; vinyl compound polymers, such as polyethylene, polypropylene, polybutene, poly-4-methyl pentene-1, polyvinyl chloride, polyvinylidene chloride, polystyrene, polyvinyl toluene, polyvinyl phenol, AS resin, ABS resin, MBS resin, poly-4-fluorinated ethylene, fluorinated ethylene-propylene copolymer, 4-fluorinated ethylene-6-fluorinated ethylene copolymer and poly-fluorinated vinylidene; resins, such as polycarbonate, polyester carbonate, polyphenylene ether, polysulfone, polyester, polyester sulfone, polyamide, polyamide imide, polyester imide and polyphenylene sulfide; and thermoplastic resins having lower molecular weight, for example, molecular weight of no more than 10,000, and usually order of thousands.

The dialkyl tin oxides employed in the practice of this invention are represented by the formula:

$$R^1R^2SnO$$

wherein each of $R^1$ and $R^2$ is $C_1$-$C_{30}$ alkyl and preferably $C_4$-$C_{12}$ alkyl. It is white, powdery solid in normal state. Particularly di-n-butyl tin oxide and di-n-octyl tin oxide are most preferable.

The dialkyl tin oxide can be incorporated in an amount of 0.001-5.0 parts by weight and preferably 0.005-1 parts by weight per 100 parts by weight of the cyanate ester compound.

A method for blending a cyanate ester compound with a solid dialkyl tin oxide is not critical. The methods include a method for merely mixing the two compounds; a method for dissolving a dialkyl tin oxide in a cyanate ester compound melted at 60° C.; a method for mixing the two compounds, followed by dissolving the mixture in a solvent; a method for dissolving 0.001-1.0 wt part of an organic acid, such as para-toluene sulfonic acid or octanoic acid to 100 wt parts of cyanate ester compound, followed by adding a dialkyl tin oxide to the mixture; a method for blending 0.001-1 wt part of an organic acid with 100 wt parts of epoxy resin, and adding a dialkyl tin oxide to the mixture and blending the mixture with a cyanate ester compound or a solution thereof; and a method for blending 0.001-1.0 wt part of an organic acid with 100 wt parts of a solvent, and adding a dialkyl tin oxide to the mixture and blending the mixture with a cyanate ester compound or a solution thereof.

According to the present invention, in addition to the dialkyl tin oxide, a well-known catalyst for polymerizing a polyfunctional cyanate ester compound may be incorporated into a cyanate ester compound. Examples of the catalysts include organic peroxides, such as benzoyl peroxide, lauroyl peroxide, di-tert.-butyl peroxide, dicumyl peroxide and di-tert.-butyl perphthalate; imidazoles, such as 2-methyl imidazole and 2-ethyl-4-methyl imidazole; tertiary amines, such as triethyl amine and N-methyl piperidine; phenols, such as phenol and cresol; organic metal salts, such as zinc naphthenate, lead stearate, lead naphthenate, zinc octoate, tin oleate, tin octoate, tin dibutyl maleate, manganese naphthenate and cobalt naphthenate; metal chelates, such as acetyl acetone cobalt, acetyl acetone iron and acetyl acetone copper; and acid anhydrides, such as trimellitic anhydride and phthalic anhydride.

The present invention is further illustrated by the following non-limiting Examples and Control Tests.

All percentages and parts in these Examples and Control Tests are by weight, unless otherwise specified.

Examples 1 and 2 and Control Test 1

Di-n-butyl tin oxide (hereinafter referred to as DBSN) or di-n-octyl tin oxide (hereinafter referred to an DOSN) in amount of 0.1% was added at 80° C. 2,2-bis(4-cyanatophenyl)propane (hereinafter referred to as TA) (97% pure).

The mixture was blended for 5 minutes and DBSN or DOSN was uniformly dissolved in TA. The resulting mixture was cooled to room temperature. The gelation time of the mixture was measured on a plate heated at 170° C. The mixture was cast and heated at 170° C. for 24 hours, at 180° C. for 3 hours and at 240° C. for 12 hours.

Glass transition point of the resulting cured product was measured.

The above procedure was repeated except that no catalyst was used. The results are shown in Table 1.

TABLE 1

|  | Control Test 1 | Example 1 | Example 2 |
|---|---|---|---|
| TA (97% pure) | 100 | 99.9 | 99.9 |
| DBSN | 0 | 0.1 | 0 |
| DOSN | 0 | 0 | 0.1 |
| Gelation time (170° C.) | more than 30 minutes | 50 seconds | 63 seconds |
| Glass transition point (°C.) | 250 | 265 | 262 |

Control Test 2

It was attempted to dissolve 0.1% of acetyl acetone iron in TA as in Examples 1 and 2. However, the acetyl acetone iron was not completely dissolved in TA and part thereof was precipitated. Gelation time of the mixture was 50 seconds.

Examples 3 and 4 and Control Tests 3 and 4

One hundred parts of TA (99.8% pure) were melted at 80° C. To the melted TA were added 0.15 parts of para-toluene sulfonic acid. Uniform, clear solution was formed. To the mixture was added 0.05 parts of DBSN or DOSN, and the mixture was blended for 5 minutes to form a uniform solution, and was cooled to room temperature.

Gelation time of the mixture was measured on a plate heated at 190° C., and glass transition point of the mixture was measured as in Examples 1 and 2.

The mixture was dissolved in methyl ethyl ketone (MEK) to form a 50% clear solution. Gelation time of the solution at 190° C. was measured.

The above procedures were repeated except that no catalyst was used.

The results are shown in Table 2.

TABLE 2

|  | Control Test 3 | Control Test 4 | Example 3 | Example 4 |
|---|---|---|---|---|
| TA (99.8% pure) | 100 | 100 | 100 | 100 |
| p-toluene sulfonic acid | 0 | 0.15 | 0.15 | 0.15 |
| DBSN | 0 | 0 | 0.05 | 0 |
| DOSN | 0 | 0 | 0 | 0.05 |
| Gelation time (190° C.) | 26 min. | 13 min. and 40 sec. | 2 min. and 27 sec. | 2 min. and 50 sec. |
| Glass transition point (°C.) | 249 | 255 | 265 | 264 |
| Gelation time in MEK solution (190° C.) | 27 min. | 14 min. and 5 sec. | 2 min. and 30 sec. | 2 min. and 59 sec. |

Examples 5 and 6 and Control Test 5

0.1 Part of catechol was added to 100 parts of bisphenol A type epoxy resin (Epikote 828, Yuka Shell Epoxy Kabushiki Kaisha, epoxy equivalent of 184-194) at 60° C. to form a uniform mixture. To the mixture was added DBSN or DOSN (0.5 parts) and the mixture was blended at 60° C.

To 100 parts of 1,4-dicyanato benzene (90% pure) were added to 2 parts of the above mixture and acetone to form a 50% acetone solution. The gelation time of the solution at 170° C. was measured.

The above procedure was repeated except that no catalyst was used. The results are shown in Table 3.

TABLE 3

|  | Control Test 5 | Example 5 | Example 6 |
|---|---|---|---|
| 1,4-dicyanato benzene | 100 | 100 | 100 |
| DBSN-incorporated epoxy resin | 0 | 2.0 | 0 |
| DOSN-incorporated epoxy resin | 0 | 0 | 2.0 |
| acetone | 100 | 102 | 102 |
| Gelation time (170° C.) | 12 minutes and 5 seconds | 1 min. and 41 sec. | 1 min. and 35 sec. |

Examples 7 and 8 and Control Tests 6-11

To a mixture of 60 parts of TA (98% pure) and 40 parts of bis(4-maleimidophenyl)methane (hereinafter referred to as BMI) (92.1% pure) was added 1.0 part of each of the catalysts as shown in Table 4. The mixtures were blended uniformly.

Each of the mixtures was placed on a plate heated at 170° C. and solubility of the catalyst to the resin was observed by the naked eye. Similarly, gelation time was measured. Each of the mixtures was melted at 150° C., cast and cured at 240° C. for 24 hours. Glass transition point of the cured product was measured.

TABLE 4

| Example or Control Test | Catalyst | Solubility of catalyst to resin | Gelation time (sec.) | Tg (°C.) |
|---|---|---|---|---|
| Example 7 | DBSN | dissolved | 39 | 268 |
| Example 8 | DOSN | dissolved | 45 | 270 |
| Control Test |  |  |  |  |
| 6 | stannous oxide | particles remain | 375 | 235 |
| 7 | stannic oxide | particles remain | 345 | 237 |
| 8 | no catalyst | — | 640 | 243 |
| 9 | tin octoate | dissolved | 48 | 261 |
| 10 | acetyl acetone tin | dissolved | 50 | 262 |
| 11 | acetyl acetone iron | particles remain | 15 | 264 |

Examples 9 and 10 and Control Tests 12 and 13

To a mixture of 70 parts of TA (96% pure) and 30 parts of BMI (92% pure) was added 0.05 parts of each of the catalysts shown in Table 5.

Gelation time at temperatures given in Table 5 was measured.

TABLE 5

| Example or Control Test |  | Gelation time | | | |
|---|---|---|---|---|---|
|  |  | 180° C. | 190° C. | 197° C. | 205° C. |
| Example 9 | DBSN | 334 | 220 | 170 | 125 |
| Example 10 | DOSN | 376 | 241 | 182 | 135 |
| Control Test |  |  |  |  |  |
| 12 | no catalyst | 571 | 443 | 355 | 289 |
| 13 | acetyl acetone iron | 185 | 141 | 103 | 82 |

Examples 11-13

TA (97% pure) was heated with stirring at 150° C. for 14 hours to form prepolymer (hereinafter referred to as TA prepolymer).

A mixture of 25 parts of TA 97% pure) and 75 parts of BMI (92% pure) was heated with stirring for 3 hours to form prepolymer (hereinafter referred to as BT prepolymer-I).

TA prepolymer and BT prepolymer-I were blended in proportions shown in Table 6. To each of the mixtures were added each of additives and each of catalysts shown in Table 6. Each of the resulting mixtures was blended at 110° C. for 5 minutes and compression-molded at 170° C. for 3 minutes. The moldings were withdrawn from a mold and placed in an oven, and cured at 250° C. for 24 hours. Glass transition points of the products were measured. The results are shown in Table 6.

TABLE 6

|  | Example 11 | Example 12 | Example 13 |
|---|---|---|---|
| TA prepolymer | 66.6 | 33.3 | 0 |
| BT prepolymer-I | 33.3 | 66.6 | 100 |
| (wt ratio of TA/BMI) | 75/25 | 50/50 | 25/27 |
| fused silica | 300 | 300 | 300 |
| wax | 3 | 3 | 3 |
| DBSN | 0.6 | 0.4 | 0.4 |
| dicumyl peroxide | 0.5 | 0.5 | 0.5 |
| Glass transition point (°C.) | 267 | 273 | 285 |

Example 14

TA (90 parts) (97% pure) and BMI (10 parts) (92% pure) were heated with stirring at 150° C. for 6 hours to form prepolymer (hereinafter BT prepolymer-II). BT prepolymer-II (100 parts) was melted at 70° C., and to the prepolymer was added 0.03 parts of DOSN. The mixture was dissolved in a mixed solvent of methyl ethyl ketone and dimethyl formamide (ratio of 1:1). Bisphenol A type epoxy resin (100 parts) (epoxy equivalent of 450-500) was added to the mixture to form a 50% uniform varnish. The varnish was impregnated into a plain-weave glass fabric 0.2 mm thick and dried at 140° C. for 7 minutes to form a B stage prepreg. Eight layers of this prepreg were stacked, and pressed at 180° C. and 40 kg/cm² for 2 hours to form laminate.

Glass transition point (Tg) of the laminate was 181° C. Even when the laminate was floated at solder heated at 300° C., no blister was formed.

When the dialkyl tin oxide is used for polymerizing a polyfunctional cyanate ester compound, the catalyst has catalytic action equivalent to a greater than the well-known catalysts. The present catalyst is more soluble in the resin composition than the well-known catalysts.

Di-n-octyl tin oxide can be used as food additives, so it is highly safe.

What is claimed is:

1. A process for polymerizing a polyfunctional cyanate ester compound which comprises heating at least one polyfunctional cyanate ester compound having the formula:

R—OCN)m wherein m is an integer of at least 2 and not more than 5; R is selected from the group consisting of arylene, $C_1$–$C_4$ alkyl, or halogen-substituted arylene, or a plurality of arylene or $C_1$–$C_4$ alkyl or halogen-substituted arylene linked by a group selected from the group consisting of

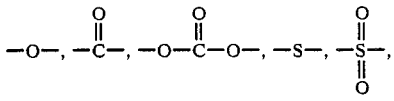

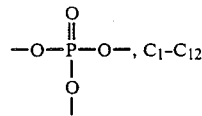

alkylene, $C_5$–$C_{12}$ cycloalkylene, and the cyanato groups are bonded to the arylene ring of said aromatic group, in the presence of a catalytic amount of a dialkyl tin oxide having the formula:

$R^1R^2SnO$ wherein each of $R^1$ and $R^2$ is $C_1$–$C_{30}$ alkyl.

2. The process of claim 1 wherein said catalyst is a dialkyl tin oxide having the formula:

$R^1R^2SnO$ wherein each of $R^1$ and $R^2$ is $C_4$–$C_{12}$ alkyl.

3. The process of claim 2 wherein said catalyst is selected from di-n-butyl tin oxide and di-n-octyl tin oxide.

4. The process of claim 1 wherein the catalyst is present in an amount of 0.001–5.0 parts by weight per 100 parts by weight of said cyanate ester compound.

* * * * *